(12) United States Patent
Sosseh et al.

(10) Patent No.: US 11,462,245 B1
(45) Date of Patent: Oct. 4, 2022

(54) VIBRATION-INDUCED ON-CYLINDER LIMIT ADJUSTMENT

(71) Applicant: Seagate Technology LLC, Fremont, CA (US)

(72) Inventors: Raye A. Sosseh, Minneapolis, MN (US); Richard P. Michel, Minneapolis, MN (US); Evgeny Rafaelovich Kharisov, Miami Beach, FL (US); Mark A. Gaertner, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/411,492

(22) Filed: Aug. 25, 2021

(51) Int. Cl.
*G11B 5/596* (2006.01)
*G11B 21/08* (2006.01)

(52) U.S. Cl.
CPC .................................. *G11B 21/08* (2013.01)

(58) Field of Classification Search
CPC .......... G11B 5/59627; G11B 20/20388; G11B 20/1217; G11B 33/125; G11B 2020/1275; G11B 2020/1281; G11B 20/1816; G11B 5/56; G11B 20/1889; G11B 2020/183; G11B 2020/1826; G11B 20/10388
USPC .............................................. 360/75, 48, 53
See application file for complete search history.

(56) References Cited

U.S. PATENT DOCUMENTS

| | | |
|---|---|---|
| 7,633,698 B2 | 12/2009 | Finamore et al. |
| 7,760,456 B2 | 7/2010 | Ding et al. |
| 8,315,006 B1 | 11/2012 | Chahwen et al. |
| 8,867,153 B1 | 10/2014 | Coker et al. |
| 8,941,943 B1 | 1/2015 | Coker et al. |
| 9,087,540 B1 | 7/2015 | Lee et al. |
| 9,099,155 B1 | 8/2015 | Kataria et al. |
| 9,236,087 B1 | 1/2016 | Dahlberg |
| 9,304,930 B2 | 4/2016 | Shu et al. |
| 9,324,362 B1 | 4/2016 | Gao et al. |
| 9,378,763 B1 | 6/2016 | Kim et al. |
| 9,437,240 B1 | 9/2016 | Haddock |
| 9,495,988 B1 | 11/2016 | Liu et al. |
| 9,583,127 B2 * | 2/2017 | Qiang .............. G11B 20/10009 |
| 9,972,353 B1 | 5/2018 | Qiang et al. |
| 9,978,417 B1 | 5/2018 | Qiang et al. |
| 10,249,338 B2 | 4/2019 | Qiang et al. |
| 10,997,996 B1 | 5/2021 | Nguyen et al. |

(Continued)

OTHER PUBLICATIONS

He, Weiping et al., "SMaRT: An Approach to Shingled Magnetic Recording Translation", usenix® The Advanced Computing Systems Association, https://www.usenix.org/conference/fast17/technical-sessions/presentation/he, This paper is included in the Proceedings of the 15th USENIX Conference on File and Storage Technologies (FAST '17), Feb. 27-Mar. 2, 2017 • Santa Clara, CA, USA, ISBN 978-1-931971-36-2, 15 pages.

*Primary Examiner* — Nabil Z Hindi
(74) *Attorney, Agent, or Firm* — Westman, Champlin & Koehler, P.A.

(57) ABSTRACT

A method includes determining at least one of an areal density margin or a reliability margin for a combination of a head and a data storage surface in a data storage drive. The method also includes employing the determined at least one of the AD margin or the reliability margin to adjust an on-cylinder limit value associated with the combination of the head and the data storage surface.

20 Claims, 3 Drawing Sheets

(56) References Cited

U.S. PATENT DOCUMENTS

| | | |
|---|---|---|
| 2006/0146433 A1 | 7/2006 | Chan et al. |
| 2009/0164843 A1 | 6/2009 | Wei et al. |
| 2012/0176698 A1* | 7/2012 | Rub .................. G11B 20/1833 |
| 2016/0034342 A1 | 2/2016 | Toh et al. |
| 2017/0097877 A1 | 4/2017 | Dhanda et al. |
| 2020/0090705 A1 | 3/2020 | Qiang et al. |

* cited by examiner

VIBRATION-INDUCED ON-CYLINDER LIMIT ADJUSTMENT

SUMMARY

In one embodiment, a method includes determining at least one of an areal density (AD) margin or a reliability margin for a combination of a head and a data storage surface in a data storage drive. The method also includes employing the determined at least one of the AD margin or the reliability margin to adjust an on-cylinder limit (OCLIM) value associated with the combination of the head and the data storage surface.

In another embodiment, a data storage device includes a data storage medium having a data storage surface, and a head configured to store data on the data storage surface. The data storage device also includes a controller configured to employ at least one of an AD margin or a reliability margin to adjust an OCLIM value associated with the combination of the head and the data storage surface.

In yet another embodiment, a method includes determining a robustness margin for a combination of a head and a data storage surface in a data storage drive. The method also includes employing the robustness margin to adjust an OCLIM value associated with the combination of the head and the data storage surface.

This summary is not intended to describe each disclosed embodiment or every implementation of vibration-induced OCLIM adjustment as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure generally relate to techniques for managing data storage device (e.g., hard disc drive (HDD) or hybrid drive) throughput and tracking capability under high vibration conditions.

In HDDs, on-cylinder limit (OCLIM) is an off-track limit used to determine when, during a write operation to a particular track, one or more tracks adjacent to that track may be overwritten by a head. OCLIM impacts tracks per inch (TPI) and, therefore, impacts areal density of the HDD. Today's HDDs trade-off OCLIM thresholds for areal density (AD) as part of a system level optimization to increase drive capacity. The lower the OCLIM, the higher the AD.

OCLIM sets servo/mechanical tracking capability thresholds in HDDs. These thresholds impact HDD in-system performance (ISP) in a customer chassis. The tracking capabilities of HDDs are limited by the servo/mechanical design space and disturbance input from chassis fan vibration as the forcing function.

Tracking disturbances that reach OCLIM, during a write command, halt the write transfer and force a delay in completing the write command. An increase in the rate of write fault events is correlated to write throughput performance loss. A write event that reaches OCLIM also causes increased degradation to sectors on the adjacent victim track. The rate of write fault events combined with the probability of the resulting degradation causing the adjacent victim sectors to be unrecoverable are factored into a track pitch capability method used to select a reliable track pitch and define AD. Tracking disturbances during a read command can also cause initial read attempts to fail, leading to read retries that cause read throughput performance loss. The loss in read throughput performance in a high vibration environment is less significant than the loss in write command throughput.

HDDs contain a collection of heads and media with a distribution of characteristics. In addition, the recording stress conditions vary depending on the location on the disc. These variations in conditions and characteristics result in a distribution of AD. A drive self-tuning process contains complex routines that attempt to measure the AD of each combination and distribute the recording margin within the drive relative to the AD in order to produce the desired drive storage capacity and reliability. Drives within a drive product population have a distribution of excess margin relative to AD.

Figure 1A:
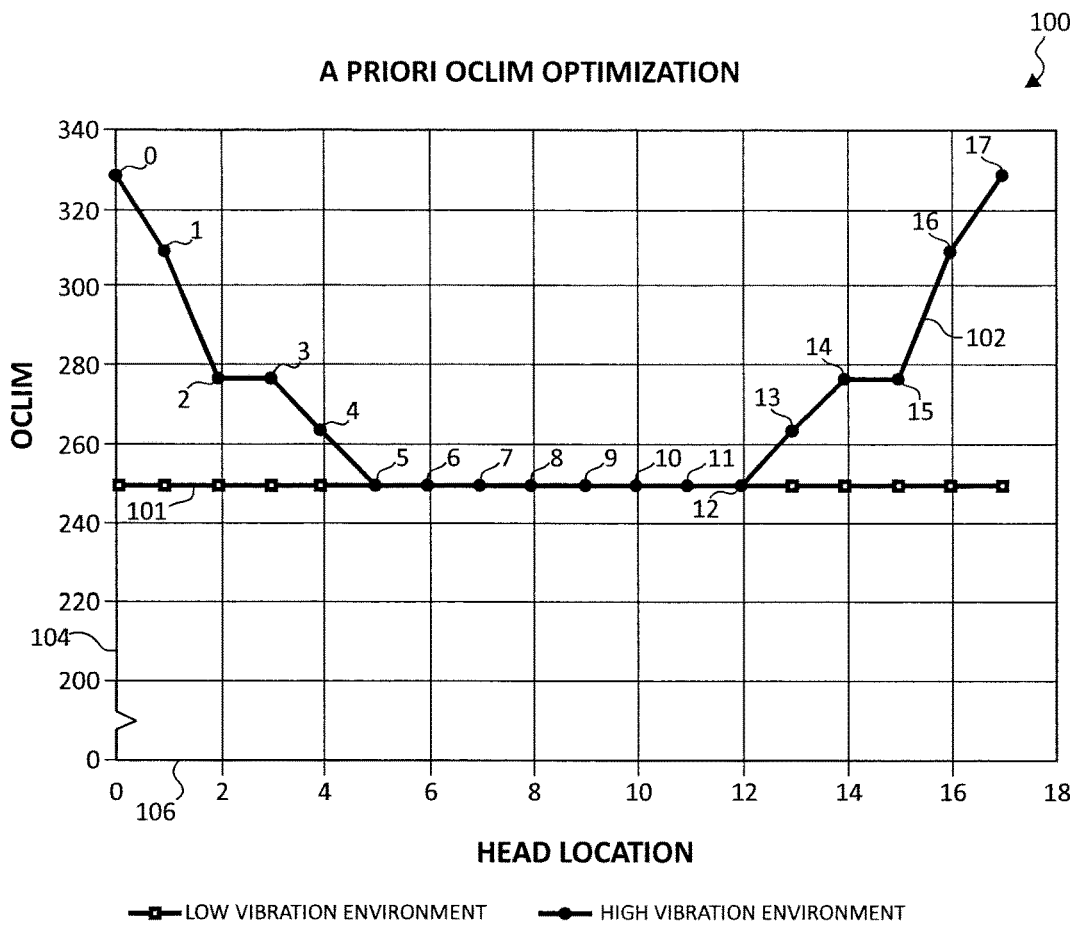
FIG. 1A is a graph showing an on-cylinder limit (OCLIM) profile curve of a 9-disc hard disc drive.

A typical 9-disc HDD may have an OCLIM profile that accounts for worst-case tracking capabilities at outermost heads in a customer chassis with high fan vibrations. FIG. 1A is a graph 100 showing an OCLIM profile curve 102 of a typical 9-disc HDD in which worst-case tracking capabilities at outermost heads are accounted for.

It should be noted that like reference numerals may be used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Referring to FIG. 1A, a vertical axis 104 represents OCLIM values in microinches (μin), and a horizontal axis 106 represents head locations. In the 9-disc HDD, locations of 18 heads (denoted 0-17) are included in FIG. 1A, with head 0 being closest to a base of the HDD, and head 17 being closest to a top cover of the HDD. By virtue of their locations, heads 0 and 17 are susceptible to the most vibration relative to the other heads, and interior heads 5-12 are susceptible to the least vibration.

Figure 1B:
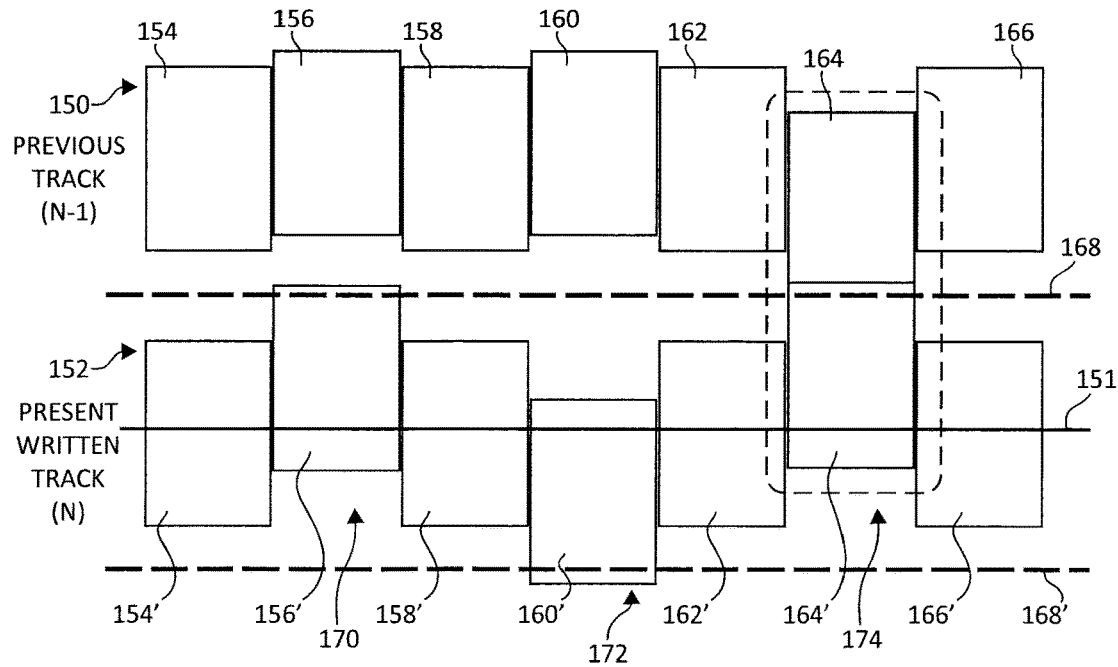
FIG. 1B is a diagrammatic illustration of OCLIM employed for tracks.

OCLIM, which is represented by vertical axis 104 in FIG. 1A, is diagrammatically shown in FIG. 1B. In FIG. 1B, portions of a previously-written track (N-1) 150 and a currently-written track (N) 152 are illustrated. In general, tracks such as 151 and 152 contain data sectors and servo wedges/sectors. The servo wedges contain information that allows a servo system to compute a head position relative to a track center (e.g., 151 of FIG. 1B). Thus, faults are detected as a function of reading the servo wedges. Since the position is computed discretely, it is known that the servo is over OCLIM at the discrete time associated with the servo wedge, not a particular data sector. However, in the interest of simplification, servo wedges are not shown in FIG. 1B. In FIG. 1B, previously-written track portion 150 includes data blocks 154-166 written to 7 consecutive sectors, and currently-written track portion 152 includes data blocks 154'-166' written to 7 consecutive sectors. FIG. 1B includes OCLIM or off-track thresholds 168 and 168' on either side of currently-written track portion 152. Since, in the example of FIG. 1B, a single OCLIM or off-track threshold 168, 168' is used on each side of the track (e.g., either side of track 152) for all sectors, a write fault is detected at a particular sector i whenever the modulus of a position error signal (PES), which is a deviation of a head from track center 151, at that sector is greater than the OCLIM or off-track threshold 168, 168' (e.g., IPES(i)I> off-track threshold at 170, 172 and 174).

Referring back to FIG. 1A, 0 on vertical axis 104 represents the track center (e.g., 151 of FIG. 1B) and the remaining OCLIM values on vertical axis 104 are distances from the track center (e.g., a distance between line 151 and line 168 of FIG. 1B in μin may represent one non-zero OCLIM value on axis 104 of FIG. 1A). In FIG. 1A, line 101 is an example of a OCLM profile in a low vibration environment. In the low vibration environment, outer and inner heads may employ the same OCLIM values. However, as indicated above, in a high vibration environment, OCLIM profile curve 102 (sometimes referred to herein as a "bathtub" OCLIM profile), which accounts for worst-case tracking capability at the outermost heads, may be employed. The increased OCLIM in the high vibration environment compared to the low vibration environment results in tracks per inch capability (TPIC) and AD reduction to maintain write throughput and sector failure rate under the worst-case conditions. However, as will be described below in connection with FIG. 2, the high vibration environment in, for example, a customer chassis is usually limited to a few drives at chassis slot locations closest to the fans. The high vibration environment is also limited in time to the duration of a fan fault situation in the customer installation.

Accordingly, instead of employing the OCLIM profile for worst-case vibration conditions (e.g., the bathtub OCLIM profile 102 shown in FIG. 1A), embodiments of the disclosure provide methods of reducing OCLIM for AD with limited a priori weighting for high vibration chassis environments. Such embodiments also vary OCLIM real-time in customer chassis installs to reduce performance degradation while limiting sector failure risks. Prior to providing details regarding the different embodiments, a description of an illustrative operating environment is provided below.

Figure 2:
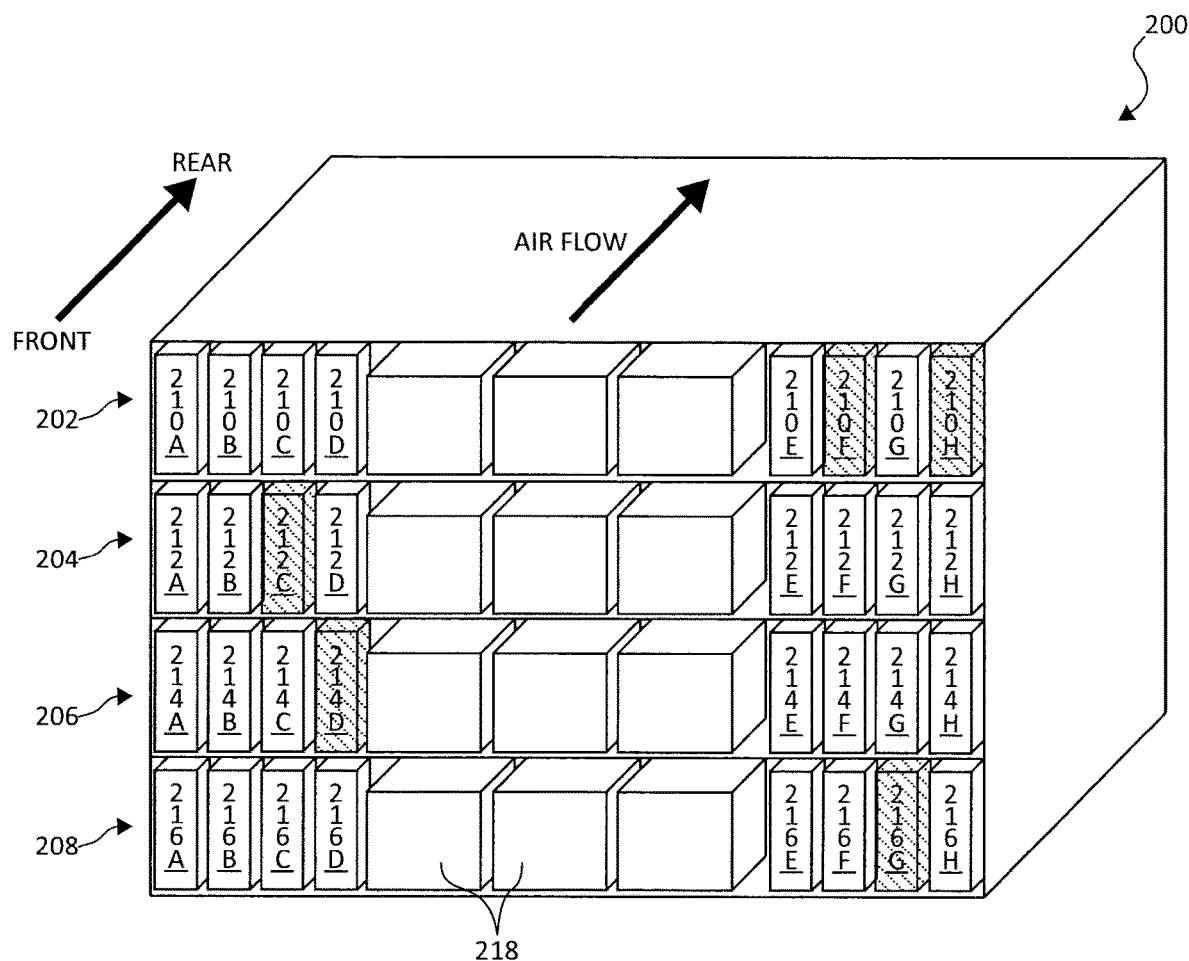
FIG. 2 is a perspective view of a data center chassis that may include data storage devices (DSDs) in accordance with embodiments of the disclosure.

FIG. 2 shows an illustrative operating environment in which certain specific embodiments disclosed herein may be incorporated. The operating environment shown in FIG. 2 is for illustration purposes only. Embodiments of the present disclosure are not limited to any particular operating environment such as the operating environment shown in FIG. 2. Embodiments of the present disclosure are illustratively practiced within any number of different types of operating environments.

FIG. 2 is a perspective view of a data center chassis 200 that may include data storage devices (DSDs) (e.g., HDDs or hybrid drives) in accordance with embodiments of the disclosure. In the embodiment of FIG. 2, chassis 200 is configured to include four nodes 202-208, which may be four different servers. It should be noted that the 4-node 202-208 configuration is only an example, and any suitable chassis configuration may be employed. Each of nodes 202-208 includes multiple DSDs (e.g., node 202 includes DSDs 210A-210H, node 204 includes DSDs 212A-212H, node 206 includes DSDs 214A-214H, and node 208 includes DSDs 216A-216H). Each node may also include one or more fans 218. Fans 218 may operate at different speeds to address different heating conditions in chassis 200 during operation of one or more of DSDs 210, 212, 214, and 216. For a specific OCLIM value employed in DSDs 210, 212, 214, and 216, vibration in the chassis 200 due to fans 218 operating at high speeds results in a reduction in throughput percentages of at least some of the DSDs 210, 212, 214, and 216. Examples of different ones of the DSDs 210, 212, 214, and 216 (e.g., DSD 214D of node 206, DSD 216G of node 208, DSDs 210F and 210H of node 202, and DSD 212C of node 204), selected to demonstrate how proximity to fans 218 impact throughput performance in a high vibration environment, are included in Table 1 below.

TABLE 1

| Fan Speed (percentage | Throughput percentage | | | | |
| --- | --- | --- | --- | --- | --- |
| of maximum fan speed) | Node 206 - DSD 214D | Node 208 - DSD 216G | Node 202 - DSD 210F | Node 202 - DSD 210H | Node 204 - DSD 212C |
| 20% | 100 | 100 | 100 | 100 | 100 |
| 50% | 100 | 100 | 100 | 100 | 100 |
| 80% | 54 | 96 | 80 | 95 | 96 |
| 90% | 1 | 75 | 59 | 70 | 69 |
| 100% | 1 | 63 | 45 | 58 | 52 |

From the fan speed percentage values and the throughput percentage values in Table 1 above, it is seen that DSD 214D, which is closest to fans 218, has its throughput percentage most severely impacted by vibration due to fans 218 operating at high speeds. In contrast, DSD 210H of node 202, which is farthest from fans 218, has its throughput percentage least severely impacted by vibration due to fans 218 operating at high speeds. Accordingly, in embodiments of the disclosure, an OCLIM profile for worst-case vibration conditions (e.g., bathtub profile 102 of FIG. 1A) may be employed more in DSD 214D than in DSD 210H. A DSD that carries out OCLIM adjustments in accordance with embodiments of the disclosure is described below in connection with FIG. 3.

Figure 3:
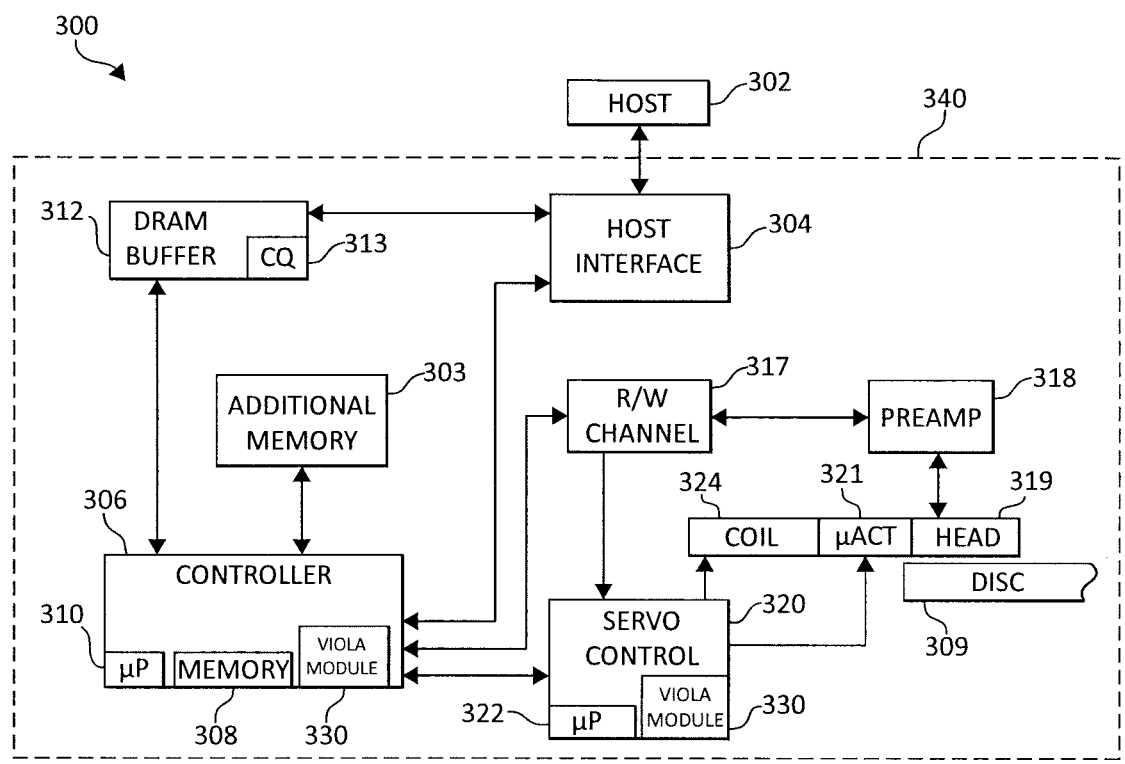
FIG. 3 is a diagrammatic illustration of a DSD in accordance with one embodiment.

FIG. 3 is a diagrammatic illustration of a DSD 300 in accordance with one embodiment. DSD 300 may be employed in a chassis such as 200 of FIG. 2 as one of DSDs 210A-210H, 212A-212H, 214A-214H, and 216A-216H. The DSD 300 may be coupled to a host 302 and may service commands from the host 302. The host 302 may also be referred to as the host system, host device or host computer. The host 302 can be a desktop computer, a laptop computer, a server, a tablet computer, a telephone, a music player, another electronic device, or any combination thereof. The DSD 300 can communicate with the host device 302 via a hardware or firmware-based interface 304. The interface 304 may comprise any interface that allows communication between a host 302 and a DSD 300, either wired or wireless, such as USB, IEEE 1394, Compact Flash, SATA, eSATA, PATA, SCSI, SAS, PCIe, Fibre Channel, Ethernet, or Thunderbolt, among others. The interface 304 may include a connector (not shown) that allows the DSD 300 to be physically removed from the host 302. In some embodiments, the DSD 300 may have a casing 340 housing the components of the DSD 300, or the components of the DSD 300 may be attached to the housing 340, or a combination thereof.

DSD 300 can include a buffer (e.g., a DRAM buffer) 312 and a programmable controller 306. Buffer 312 can temporarily store data during read and write operations, and can include a command queue (CQ) 313 where multiple pending operations can be temporarily stored pending execution. Commands arriving over the interface 304 may automatically be received in the CQ 313 or may be stored there by controller 306, interface 304, or another component.

Programmable controller 306 can include associated memory 308 and processor (e.g., a microprocessor (µP)) 310. In some embodiments, the DSD 300 can include a read-write (R/W) channel 317, which can encode data during write operations and reconstruct user data retrieved from a memory, such as disc(s) 309, during read operations. A preamplifier circuit (preamp) 318 can apply write currents to one or more heads 319 and provides pre-amplification of read-back signals. A servo control circuit 320 may use servo data to provide the appropriate current to a coil 324, sometimes called a voice coil motor (VCM), to position the head(s) 319 over a desired area of the disc(s) 309. The controller 306 can communicate with a processor 322 to move the head(s) 319 to the desired locations on the disc(s) 309 during execution of various pending commands in the CQ 313.

In some embodiments, the DSD 300 may include solid state memory instead of or in addition to disc memory. For example, the DSD 300 can include an additional memory 303, which can be either volatile memory such as DRAM or SRAM, or nonvolatile memory, such as NAND Flash memory. The additional memory 303 can function as a cache and store recently or frequently read or written data, or data likely to be read soon. Additional memory 303 may also function as main storage instead of or in addition to disc(s) 309. A DSD 300 containing multiple types of nonvolatile storage media, such as a disc(s) 309 and Flash memory 303, may be referred to as a hybrid storage device.

To read or write data to a storage medium such as disc(s) 309, DSD 300 may employ servo data to properly position head 319 over a desired track. Servo data used to identify a head's location over a disc may be recorded onto disc(s) 309, interspersed between user data. Servo data may be read from disc(s) 309 by head 319 as the disc(s) 309 spin and the head 319 position is adjusted. The read servo data may be provided to preamp circuit 318. The preamp circuit 318 may preamplify and filter the readback signals from the transducer head 319, and provide the processed servo data to read/write channel 317. The R/W channel 317 can detect and condition the servo data, including application of automatic gain control and conversion of the signals to digital form.

Servo control 320 can process the digitized servo data to generate a current command signal. The command signal may be used to apply the appropriate current to the coil 324 to position the transducer 319 over the disc(s) 309. The servo data may be used to determine a current track location of the head 319, and calculate adjustments to move to a target track, which may be called track seeking. Once the head 319 is over a desired track, the servo data may be used to maintain the head's position over the track during read or write operations, which may be called track following.

In certain embodiments, to attain fine position control of the head 319 relative to a selected data track, a head stack assembly (HSA) can include a micro-actuator (µACT) 321 (which may also be referred to as a secondary actuator motor) supported by a load arm. The micro-actuator 321 can include a bipolar piezoelectric transducer that responds to positive voltage inputs by expanding in a predetermined direction, while contracting in the predetermined direction to application of a negative voltage. As the micro-actuator 321 can be affixed to a load arm of a HSA, changes in mechanical position of the micro-actuator relative to the selected data track results in changes in mechanical position of the head 319 relative to the selected data track of the disc 309, thereby facilitating fine position control of the head 319 relative to the selected data track.

Due to various influences (including vibration caused by fans in a chassis as described above in connection with FIG. 2), a head 319 may not perfectly follow a target track, which may lead to track misregistration (TMR) which can involve misalignments of the head 319 with a given track. The servo data may include burst signals, which may be called position error signal (PES) bursts. The PES bursts may be used to determine a PES value, which, as described above in connection with FIG. 1B, represents an offset between a head's 319 current position and the track center. As described earlier in connection with FIG. 1B, if a head 319 deviates too far from a desired track center during a write operation such that the OCLIM or off-track threshold is exceeded, a write fault may be declared by controller 306 and/or by servo control circuit 320. During high vibration conditions, PES may increase, and OCLIM may be adjusted (e.g., increased to accommodate the increase in PES) by a vibration induced OCLIM adjustment (VIOLA) module 330.

The VIOLA module 330 may be a processor, controller, or other circuit, or it may be a set of software instructions that, when executed by a processing device, perform the functions of the VIOLA module 330. In some embodiments, the VIOLA module 330 may be part of or executed by controller 306, and/or part of or executed by servo control circuit 320. VIOLA module 330 is configured to make OCLIM adjustments based on AD and/or reliability margins obtained for each head 319 during manufacture (and possibly during operation of DSD 300 in the field). In some embodiments, different quantities (such as bit error rate (BER) performance, TPI capability, etc.) may be determined for each head-medium combination, and, based on the determined quantities, AD margin data for each head 319 may be ascertained and stored in any suitable memory in DSD 300. The AD margin data for each head 319 may then be utilized by VIOLA module 330 to adjust OCLIM values for the head(s) 319 in an operating environment of the of the DSD 300. For example, when a chassis such as 200 (of FIG. 2)

includes DSDs 300 in its slots, VIOLA module 330 in each chassis DSD 300 may utilize head-by-head factory AD margin data to adjust head-by-head OCLIM in the in the chassis slots with vibration issues during fan fault conditions. In any chassis DSD 300 that is affected by vibration, OCLIM values of heads 319 with higher AD margin may be increased by VIOLA module 330 during write fault conditions in order to minimize the throughput degradation of the DSD 300. In certain embodiments, the ability of the VIOLA module 330 to make OCLIM adjustments may be improved by enhancing AD margin data utilized by the VIOLA module 330 to make OCLIM adjustments. This may be carried out by deploying a simulated chassis disturbance injection toolset in factory and reliability testbeds to tune head-by-head AD margin metrics. VIOLA module 330 may also be configured to employ additional metrics/data to carry out OCLM-related adjustments in DSD 330. Some examples of examples of additional metrics/data are included below.

Increasing OCLIM carries certain risks. For example, increasing OCLIM for a write operation to one track may result in previously-written data on an adjacent track being overwritten when the write operation is carried out. To address such possibilities of overwrites, before increasing the OCLIM, embodiments of the disclosure utilize a tracking PES metric to document tracking quality during write commands in the event of OCLIM increase, to gauge potential of degradation from an adjacent track write.

In general, the stronger the error correction code (ECC) protection for data on a particular track, the more the OCLIM associated with a track adjacent to that particular track may be increased. Accordingly, some embodiments utilize the strength of the ECCs on the adjacent tracks as an indicator of error recovery robustness to increased encroachment likelihood with OCLIM increase, on a write command by write command basis.

In DSDs, error correction operations may include a media scan and media rewrite, which are known procedures that may be carried out to alleviate the effects of adjacent track interference (ATI) and/or side track erasure (STE). A media scan is triggered when runtime measures of ATI and/or STE are equal to or exceed one or more predetermined thresholds. In some embodiments, runtime measures of ATI and/or STE on adjacent tracks are utilized as an indicator of existing loss of margin due to ATI/STE encroachments to modulate the OCLIM increase on a write command by write command basis.

Some embodiments factor the impacts of individual components of disturbances (operational vibration, shock, etc.) into the risks of adjusting OCLIM. Also, in some embodiments, a possibility of isolating different components of the disturbances is determined. Then, any isolatable components and their respective disturbance contributions are determined, and the OCLIM is accordingly dynamically adjusted based on the current environment of the DSD.

As noted above, runtime measures of ATI and/or STE on adjacent tracks are utilized as an indicator of existing loss of reliability margin due to ATI/STE encroachments to modulate the OCLIM increase on a write command by write command basis. However, once OCLIM is increased, ATI/STE may also increase. Thus, some embodiments may dynamically adjust runtime measures tracking ATI and/or STE when the DSD is operating in transient wide/increased OCLIM conditions.

Some DSDs employ a media cache (MC). In DSD embodiments of the disclosure that include a MC, writes to MC areas not prone to high PES may be carried out during high vibration conditions. In some embodiments, writebacks to problematic areas (e.g., outer heads such as 0 and 17 of FIG. 1A) may not be cleaned during high vibration conditions.

In general, the most robust tracks have strong ECC, and a PES metric indicating that a high number of sectors were written near track center. The more robust adjacent track(s) are, the higher the OCLIM can be increased when writing the track of interest in a high vibration environment to mitigate performance loss. In the case of conventional magnetic recording (CMR), an asymmetrical approach can be deployed in which OCLIM is different in one direction versus the other. In such a case, OCLIM would be higher in the direction of the more robust adjacent track.

A more conservative increase in OCLIM is utilized when either adjacent track(s) are of low quality or of uncertain quality. Uncertain quality occurs in the absence of one or more of the earlier-noted quality attributes (e.g., tracking PES metric indicating quality of the adjacent written track(s), and strong ECC).

A CMR system may cache PES metric information. Such a system may choose to prioritize retention of tracking PES metric for tracks written with atypical PES samples (either very high or low quality). It may also choose to retain PES samples for tracks near frequently written tracks.

Some HDD CMR systems already track certain types of ECCs. Additional types of ECCs may augment such schemes. The additional types of ECCs may be retained in, for example, volatile dynamic random access memory (DRAM) and/or a non-volatile memory (e.g., MC). The additional types of ECCs may be retained for tracks written with poorer quality (e.g., poor PES) and for tracks that are near frequently written tracks.

Runtime measures of ATI and/or STE are already maintained in some HDDs. Single track resolved runtime measures of ATI and/or STE may be more beneficial than multi-track resolved measures. A runtime measure of ATI and/or STE that resolves the directional PES information may also be of value. The worse the PES in a given direction, the more aggressive the runtime measure for ATI and/or STE is applied.

In the above-described embodiments, AD margin, reliability margin, and several other metrics/margins are utilized to modify OCLIM. In general, a robustness margin that includes one or more of the AD margin, the reliability margin and the other metrics/margins described herein may be utilized to modify OCLIM.

In one experiment, it was found that a 1% excess AD margin approximately equated to the capability to increase OCLIM by 1% under high vibration without exceeding the write fault rate and unrecoverable error rate from encroachment design rules.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   determining a robustness margin for a combination of a head and a data storage surface in a data storage drive; and
   employing the determined robustness margin and information regarding vibration environment of the data storage device to adjust an on-cylinder limit (OCLIM) value associated with the combination of the head and the data storage surface.

2. The method of claim 1 and wherein:
   the robustness margin comprises at least one of an areal density (AD) margin or a reliability margin;
   the at least one of the AD margin or the reliability margin is determined during manufacture of the data storage drive, and
   the determined at least one of the AD margin or the reliability margin is employed to adjust the OCLIM value associated with the combination of the head and the data storage surface in an operating environment of the data storage drive.

3. The method of claim 1 and further comprising determining whether the OCLIM value for a write operation by the head to a first track on the data storage surface is alterable from a first OCLIM value to a second OCLIM value, which is higher than the first OCLIM value, based on an error correction code (ECC) protection level of a second track that is adjacent to the first track on the data storage surface.

4. The method of claim 1 and further comprising determining whether the OCLIM value for a write operation by the head to a first track on the data storage surface is alterable from a first OCLIM value to a second OCLIM value, which is higher than the first OCLIM value, based on a runtime measure of at least one of adjacent track interference (ATI) or side track erasure (STE) of a second track that is adjacent to the first track on the data storage surface.

5. The method of claim 1 and further comprising obtaining position error information (PES) information to document tracking quality during write operations by the head to tracks on the data storage surface when the OCLIM value is increased from a first OCLIM value to a second OCLIM value, and employing the PES information to gauge a potential of degradation of data stored on a second track during a write operation to first track that is adjacent to the second track.

6. The method of claim 1 and further comprising dynamically scaling a runtime measure of at least one of ATI or STE in response in a change in the OCLIM value from a first OCLIM value to a second OCLIM value.

7. The method of claim 1 and further comprising:
   for a write operation to a first track between second and third tracks on either side of the first track and adjacent to the first track, employing a first OCLIM value in a direction of the second track, and employing a second OCLIM value in a direction of the third track, the second OCLIM value being different from the first OCLIM value when an ECC protection level of the second track is different from an ECC protection level of the third track.

8. The method of claim 1 and wherein the determined robustness margin comprises an areal density margin metric tuned using a simulated disturbance of a chassis into which the data storage device is to be installed.

9. A data storage device comprising:
   a data storage medium having a data storage surface;
   a head configured to store data on the data storage surface; and
   a controller configured to employ a robustness margin and input regarding an environment of the data storage drive to adjust an on-cylinder limit (OCLIM) value associated with the combination of the head and the data storage surface.

10. The data storage device of claim 9 and wherein the controller is further configured to determine whether the OCLIM value for a write operation by the head to a first track on the data storage surface is alterable from a first OCLIM value to a second OCLIM value, which is higher than the first OCLIM value, based on an error correction code (ECC) protection level of a second track that is adjacent to the first track on the data storage surface.

11. The data storage device of claim 9 and wherein the controller is further configured to determine whether the OCLIM value for a write operation by the head to a first track on the data storage surface is alterable from a first OCLIM value to a second OCLIM value, which is higher than the first OCLIM value, based on a runtime measure of at least one of adjacent track interference (ATI) or side track erasure (STE) of a second track that is adjacent to the first track on the data storage surface.

12. The data storage device of claim 9 and wherein the controller is further configured to obtain position error information (PES) information to document tracking quality during write operations by the head to tracks on the data storage surface when the OCLIM value is increased from a first OCLIM value to a second OCLIM value, and employ the PES information to gauge a potential of degradation of data stored on a second track during a write operation to first track that is adjacent to the second track.

13. The data storage device of claim 9 and wherein the controller is further configured to dynamically scale a run-time measure of at least one of ATI or STE in response to a change in the OCLIM value from a first OCLIM value to a second OCLIM value.

14. The data storage device of claim 9 and wherein the controller is further configured to:
for a write operation to a first track between second and third tracks on either side of the first track and adjacent to the first track, employ a first OCLIM value in a direction of the second track, and employ a second OCLIM value in a direction of the third track, the second OCLIM value being different from the first OCLIM value when an ECC protection level of the second track is different from an ECC protection level of the third track.

15. A method comprising:
determining a robustness margin for a combination of a head and a data storage surface in a data storage drive; and
employing the robustness margin and input regarding an environment of the data storage drive to adjust an on-cylinder limit (OCLIM) value associated with the combination of the head and the data storage surface.

16. The method of claim 15 and wherein:
the robustness margin is determined during manufacture of the data storage drive, and
the determined robustness margin is employed to adjust the OCLIM value associated with the combination of the head and the data storage surface in an operating environment of the data storage drive.

17. The method of claim 15 and wherein the robustness margin comprises an areal density (AD) margin.

18. The method of claim 15 and wherein the robustness margin comprises a reliability margin.

19. The method of claim 15 and wherein the robustness margin comprises an error correction code (ECC) protection margin.

20. The method of claim 15 and wherein the robustness margin comprises at least one of an adjacent track interference (ATI) margin or a side track erasure (STE) margin.

* * * * *

UNITED STATES PATENT AND TRADEMARK OFFICE
CERTIFICATE OF CORRECTION

| | | |
|---|---|---|
| PATENT NO. | : 11,462,245 B1 | Page 1 of 1 |
| APPLICATION NO. | : 17/411492 | |
| DATED | : October 4, 2022 | |
| INVENTOR(S) | : Raye A. Sosseh et al. | |

It is certified that error appears in the above-identified patent and that said Letters Patent is hereby corrected as shown below:

In the Claims

Column 9, Claim 1, Line 43, please insert the word --a-- between the words "regarding" and "vibration".

Column 10, Claim 5, Line 8, please replace the word "information" before the word "(PES)" with the word --signal--.

Column 10, Claim 12, Line 63, please replace the word "information" before the word "(PES)" with the word --signal--.

Signed and Sealed this
Sixth Day of December, 2022

Katherine Kelly Vidal
*Director of the United States Patent and Trademark Office*